(No Model.)

G. W. HOWELL.
WHEEL.

No. 356,643. Patented Jan. 25, 1887.

Attest
J. Watson Sims
J. Simpson Roebuck Jr.

Inventor
George W Howell
by Wood & Boyd
his Attorneys

UNITED STATES PATENT OFFICE.

GEORGE W. HOWELL, OF COVINGTON, KENTUCKY.

WHEEL.

SPECIFICATION forming part of Letters Patent No. 356,643, dated January 25, 1887.

Application filed January 11, 1886. Serial No. 188,241. (No model.)

*To all whom it may concern:*

Be it known that I, GEORGE W. HOWELL, a resident of Covington, in the county of Kenton and State of Kentucky, have invented certain new and useful Improvements in Wheels, of which the following is a specification.

My invention relates, primarily, to the method of constructing wheel-hubs, and, secondarily, to the means for connecting two hubs together for tightening spokes. One of the objects of my invention is to employ ready means for locking the spokes in position. Another object of my invention is to construct the wheel of parts, so that the same can be readily put together and tightened or taken apart for repairs, or to be shipped as a knockdown wheel, all of which will be specifically set forth in the description of the accompanying drawings, making a part of this specification, in which—

Figure 1:
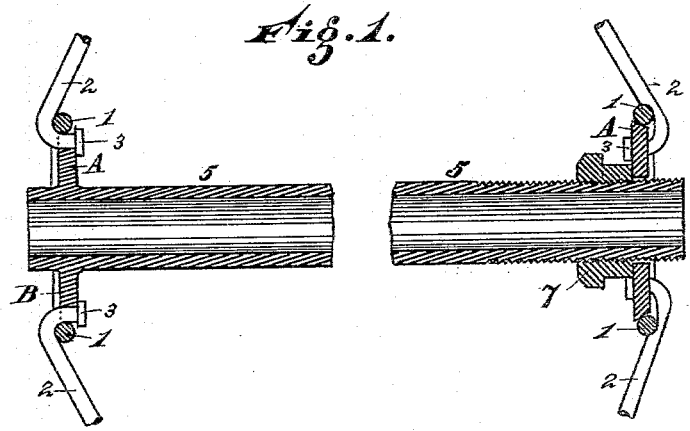
Figure 2:
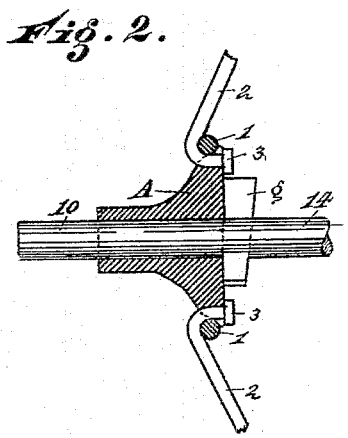
Figure 4:
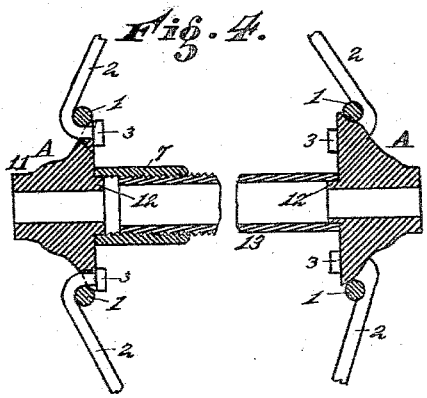
Figure 3:
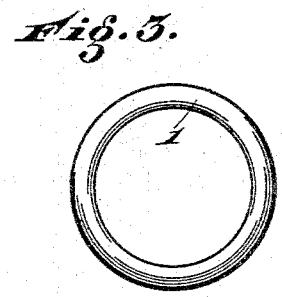
Figure 5:
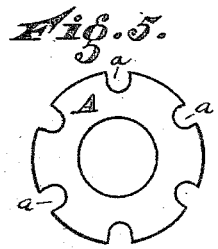

Figure 1 is a longitudinal central section of my improved lock-hub in position on the sleeve. Fig. 2 is a modification of Fig. 1. Fig. 3 is a detail view of the ring. Fig. 4 is another modification of Fig. 1. Fig. 5 is a plan view of the locking-disk.

A, Fig. 1, represents the disk, which is pierced with a suitable orifice in the center, adapted to slip on over the sleeve 5.

B, Fig. 1, represents the disk attached solidly to the hub; but the preferred form is to have both disks loose. One of them, however, may be rigidly attached to the hub, and the tightening or locking all performed by the adjustment of the other disk.

$a$ represents a series of notches pierced in the disk, of sufficient depth to receive the necks of the spokes 2, which rest therein, and allow the ring 1 to rest upon the disk and upon the periphery of the spokes, so as to lock them in position on the disk.

3 represents a head formed on the neck of the spokes, to prevent their being drawn out of the lock.

The shaft 5 is preferably made hollow, so as to serve as a boxing for the axle. It, however, may be made solid, with gudgeons on the end to serve as a journal-bearing, if desired.

The preferred form of constructing the wheel is as follows: The spokes are secured to the rim of the wheel in any well-known manner, and the necks of the series of spokes are placed inside of the ring 1. The ring is then seated upon the disk A with the spokes resting in the notches $a$, the heads of the spokes being on the inner sides of the disks, and the spokes tightened to the rim by moving the disks outward and locking them in position, so as to strain the spokes and the rim.

I have shown three modes of locking the parts in position. In Fig. 1 the disk B is rigidly secured to the sleeve 5, and a screw-threaded collar, 7, is tapped upon the sleeve, with its inner end abutting against the disk A. As the screw-collar 7 is turned downward the disk A is driven and spreads the necks of the spokes 2 2 apart and strains the wheel. It is obvious that a similar collar 7 may be placed upon the opposite end and the disk B slid upon the sleeve, instead of being rigidly connected thereto. In Fig. 2 the locking is shown as accomplished by a taper key, $g$, driven through a slot cut in the sleeve or shaft 14. This shaft is shown solid, and the end 10 represents one of the journal-gudgeons on each side of the hub of the wheel. In Fig. 4 the disk A is provided with an extended hub, 11, and an inwardly-extended hub, 12, over which the collar 7 projects, and the opposite end is shown with a sleeve, 13, resting upon a similar hub 12, to form the other side of the hub. In this modification the sleeve 13 holds the hubs A in position and the collar 7 serves as an extension for the sleeve 13 as it is turned to drive one of the disks outward to strain the spokes and rim of the wheel.

By employing the locking-ring 1 and the notched disk A to form the wheel-hub in the manner described several advantages are gained: first, cheapness of construction; second, the readiness of putting the wheels together and taking them apart to ship the same as knockdown wheels; third, the spreading devices $g$ and 7, which spread the disks A and strain the wheel, draw the lock-ring to the disk tautly by the engagement of the neck and hooked portions of the spokes simultaneously with the strain, so that all lost motion and danger of rattling is taken up by the straining, so that I am enabled to get a readily-locking device which can be strained to take up all lost motion and draw and hold all parts rigidly together in a cheaper and better manner than wheels hitherto employed for this purpose.

I am aware that wheels have heretofore been made with two sets of spokes having bent and headed ends, which are engaged from within outward with notched castings and collars carried at the opposite ends of a connecting shaft or box, said collars being located in the outside of the spokes, which are spread or expanded by means of a nut to which one of the spoke-supporting castings is threaded. This construction, however, I do not claim.

What I claim as my invention is—

1. A wheel-hub composed of notched disks, a connecting-shaft, and rings resting against shoulders formed on the peripheries of said disks, in combination with hooked spokes engaging said notched disks and rings from their outer sides and having heads 3 lying against the inner sides of said disks, the rings being confined between the disks and the necks of the spokes when the disks are forced apart, substantially as described.

2. A wheel composed of two notched disks, hooked spokes 2, resting in the notches of said disks, and having heads 3, bearing against the inner sides of said disks, the locking-rings 1, a sleeve or shaft connecting the disks, and a spreading device for forcing the disks apart, substantially as described.

3. The combination of a sleeve or shaft having notched disks on its opposite ends, hooked spokes engaging said disks from the outside, locking-rings 1, located on the inner sides of the spokes and resting against shoulders formed on the peripheries of the disks, and a spreading-nut, 7, supported on the shaft or sleeve and abutting against the inner side of one of the notched disks, substantially as described.

4. A wheel-hub composed of two notched disks and a connecting shaft or sleeve, in combination with hooked spokes engaging said notched disks from their outer sides, a locking-ring embracing the hooked ends of said spokes and securing them to the notched disks, and a screw-collar located on the shaft or sleeve and abutting against the inner side of one of the hub-disks, substantially as described.

In testimony whereof I have hereunto set my hand.

GEO. W. HOWELL.

Witnesses:
E. E. WOOD,
ROBERT ZAHNER.